(12) United States Patent
Sugimoto et al.

(10) Patent No.: US 10,762,622 B2
(45) Date of Patent: Sep. 1, 2020

(54) FABRIC INSPECTION DEVICE AND INK-JET PRINTING DEVICE THEREWITH

(71) Applicant: KYOCERA Document Solutions Inc., Osaka (JP)

(72) Inventors: Hiroko Sugimoto, Osaka (JP); Yukari Kida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/541,928

(22) Filed: Aug. 15, 2019

(65) Prior Publication Data

US 2020/0090317 A1    Mar. 19, 2020

(30) Foreign Application Priority Data

Sep. 19, 2018 (JP) ................................ 2018-174881
Sep. 19, 2018 (JP) ................................ 2018-174886
Sep. 19, 2018 (JP) ................................ 2018-174890

(51) Int. Cl.
   *G06T 7/00*    (2017.01)
   *G06K 15/10*   (2006.01)
   *G06K 15/02*   (2006.01)

(52) U.S. Cl.
   CPC ............ *G06T 7/001* (2013.01); *G06K 15/022* (2013.01); *G06K 15/102* (2013.01);
   (Continued)

(58) Field of Classification Search
   CPC ....... G01N 21/8983; G01N 2021/8887; G01N 21/89; G01N 2201/102;
   (Continued)

(56) References Cited

U.S. PATENT DOCUMENTS

| | | | | |
|---|---|---|---|---|
| 4,904,318 A | * | 2/1990 | Goto | B26D 5/32 156/64 |
| 5,440,409 A | * | 8/1995 | Sugano | G03G 21/046 283/902 |

(Continued)

FOREIGN PATENT DOCUMENTS

| | | |
|---|---|---|
| JP | H 8-201311 A | 8/1996 |
| JP | H 8-254503 A | 10/1996 |

(Continued)

*Primary Examiner* — Negussie Worku
(74) *Attorney, Agent, or Firm* — Stein IP, LLC

(57) ABSTRACT

A fabric inspection device includes a sheet conveying portion, an image reading portion, a timing control portion, a storage portion, a comparing control portion, and a display portion. The image reading portion reads a plurality of images of the same pattern recorded repeatedly with a predetermined pitch on a recording sheet conveyed by the sheet conveying portion. The timing control portion regulates the timing of image reading by the image reading portion. The storage portion stores the plurality of images read by the image reading portion. The comparing control portion takes, out of the plurality of images stored in the storage portion, part of an image continuously recorded on the recording sheet corresponding to the forefront one pitch as a reference image and compares the image data of a comparison image recorded later than the reference image with image data of the reference image to check for image defects.

15 Claims, 5 Drawing Sheets

(52) U.S. Cl.
CPC ............... *G06T 2207/10024* (2013.01); *G06T 2207/30124* (2013.01); *G06T 2207/30144* (2013.01)

(58) Field of Classification Search
CPC ........... G06T 2207/30124; G06T 7/001; G06T 17/00; G06T 17/20; G06T 19/006; G06T 19/20; G06T 2200/08; G06T 2207/10008; G06T 2207/10028; G06T 2207/20021; G06T 2207/20064; G06T 2207/20076; G06T 2207/20081; G06T 2207/20084; G06T 2219/2004; G06T 2219/2012; G06T 2219/2016; G06T 7/0004; G06T 7/0006; G06T 7/11; G06T 7/50; G06T 7/73; A41H 3/007; D03D 51/18; D03J 1/005; D03J 1/007; D03J 1/24; D06H 3/08; G02B 2027/0138; G02B 2027/014; G02B 2027/0141; G02B 27/0172; G06K 2209/27; G06K 9/00201; G06K 9/3233; G06K 9/6257; G06K 9/626; G06K 9/6267; G03G 15/0173; G03G 15/04045; G03G 15/043; G03G 15/05; G03G 15/161; G03G 15/167; G03G 15/2017; G03G 15/5062; G03G 15/55; G03G 21/046; G03G 2215/00299; G03G 15/0105; H04N 1/00846; H04N 1/00859; H04N 1/00867; H04N 1/00875; Y10S 283/902

USPC ........................................................ 358/506
See application file for complete search history.

(56) References Cited

U.S. PATENT DOCUMENTS

| | | | | |
|---|---|---|---|---|
| 9,621,785 | B2* | 4/2017 | Chang | ................ H04N 5/23212 |
| 9,942,531 | B2* | 4/2018 | Sourani | ................ H04N 9/3194 |
| 9,978,153 | B2* | 5/2018 | Kisner | .................... G06T 5/001 |
| 10,013,629 | B2* | 7/2018 | Lin | ............................ G06T 7/60 |
| 10,277,823 | B2* | 4/2019 | Tsubusaki | ............. G06K 9/3233 |
| 10,341,565 | B2* | 7/2019 | Robinson | ........... H04N 5/23267 |
| 10,378,877 | B2* | 8/2019 | Nagano | ..................... G06T 7/74 |
| 2012/0314253 | A1* | 12/2012 | Kurihara | ............ H04N 1/00005 358/1.15 |
| 2013/0229454 | A1* | 9/2013 | Yatsunami | ........... B41J 11/0095 347/14 |
| 2015/0260673 | A1* | 9/2015 | Seto | .................... G01N 33/0059 73/335.03 |
| 2018/0267422 | A1* | 9/2018 | Maeda | ................. G03G 15/043 |
| 2019/0050975 | A1* | 2/2019 | Nakamura | ......... G03G 15/6517 |
| 2019/0179246 | A1* | 6/2019 | Kaneko | ............. G03G 15/0266 |
| 2019/0268522 | A1* | 8/2019 | Hayashi | ................ G06T 7/0004 |
| 2020/0011009 | A1* | 1/2020 | Arai | ......................... D21B 1/06 |

FOREIGN PATENT DOCUMENTS

| | | |
|---|---|---|
| JP | 2013-154540 A | 8/2013 |
| JP | 2016-206691 A | 12/2016 |

\* cited by examiner

FIG.5
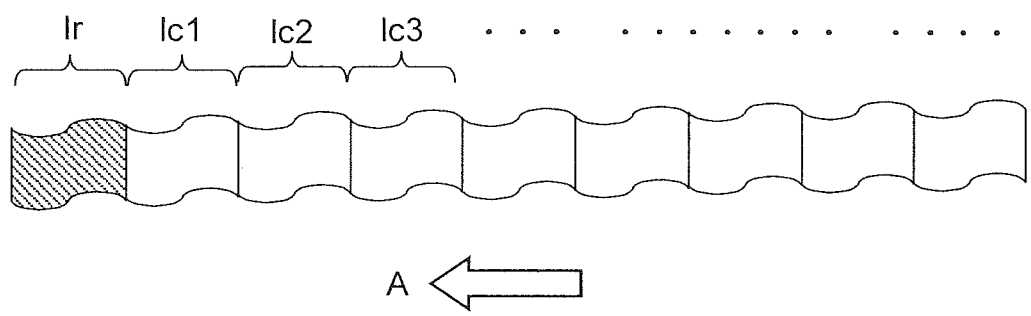
A ⟵
FIG.6A    FIG.6B
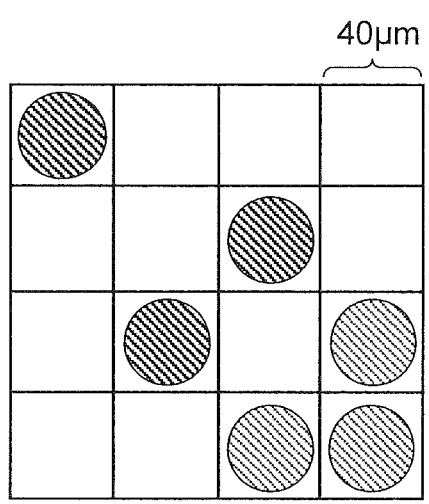
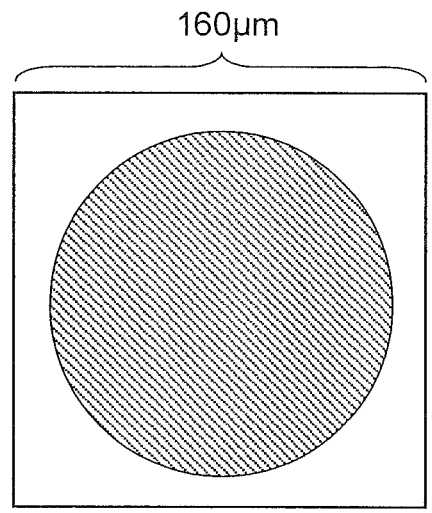

FABRIC INSPECTION DEVICE AND INK-JET PRINTING DEVICE THEREWITH

INCORPORATION BY REFERENCE

This application is based upon and claims the benefit of priority from the corresponding Japanese Patent Applications No. 2018-174881 filed on Sep. 19, 2018, No. 2018-174886 filed on Sep. 19, 2018, and No. 2018-174890 filed on Sep. 19, 2018, the entire contents of which are incorporated herein by reference.

BACKGROUND

The present disclosure relates to a fabric inspection device that detects defects in images of the same pattern recorded repeatedly with a predetermined pitch on a continuous recording sheet, and to an ink-jet printing device incorporating such a fabric inspection device.

As a method for printing on continuous cloth, there are known a direct printing method, in which an image is printed directly on a material on an ink-jet printer, and a transfer printing method, in which an image is printed on special paper (transfer paper) on an ink-jet printer having disperse dye ink (sublimation ink) and then the ink on the transfer paper is evaporated on a thermal transfer device so that only the ink permeates a material (mainly polyester).

The cloth having undergone printing processing as described above is usually passed through an inspection step to check for image defects. Although, on conventional fabric inspection devices, the cloth having undergone printing processing is conveyed automatically, inspection is carried out visually; that is, there is no device available for checking image defects automatically with respect to the whole range of cloth. Thus, image defects are overlooked, resulting in output of low quality printed articles.

To avoid that, there have been proposed methods for automatically checking defects on cloth. For example, there is known an automatic fabric inspection device that determines, when a woven fabric as an inspection target is imaged with an imaging means and the level of the image signal acquired as the result of the imaging is out of the permissible range, that there are defects on the woven fabric. There is also known a correction value acquiring method that acquires correction values for individual recording elements by use of a reading device having a resolution lower than the resolution of the recording elements.

There is also known an image inspection device that stores a reference image and an inspection image and that detects a difference based on color differences of an RGB image while performing image inspection processing with first data of the reference image and second data of the inspection image associated with each other at the pixel level.

SUMMARY

According to one aspect of the present disclosure, a fabric inspection device includes a sheet conveying portion, an image reading portion, a timing control portion, a storage portion, a comparing control portion, and a display portion. The sheet conveying portion conveys a continuous recording sheet. The image reading portion reads a plurality of images of the same pattern recorded repeatedly with a predetermined pitch on the recording sheet conveyed by the sheet conveying portion. The timing control portion regulates the timing with which the image reading portion reads images. The storage portion stores the plurality of images read by the image reading portion as image data. The comparing control portion takes, out of the plurality of images stored in the storage portion, part of an image continuously recorded on the recording sheet corresponding to the forefront one pitch as a reference image, and compares, with the image data of the reference image, the image data of a comparison image having the same pattern as a reference image and recorded on the recoding sheet later than the reference image to check for image defects. The display portion displays the result of checking by the comparing control portion.

Further features and advantages of the present disclosure will become apparent from the description of embodiments given below.

BRIEF DESCRIPTION OF THE DRAWINGS

FIG. 5 is a schematic view showing a relationship between a reference image and a comparison image;

FIG. 6A is a conceptual diagram showing one of images of different resolutions read in the image reading portion, showing an image read at a resolution of 600 dpi;

FIG. 6B is a conceptual diagram showing another of images of different resolutions read in the image reading portion, showing an image read at a resolution of 150 dpi;

DETAILED DESCRIPTION

Figure 1:
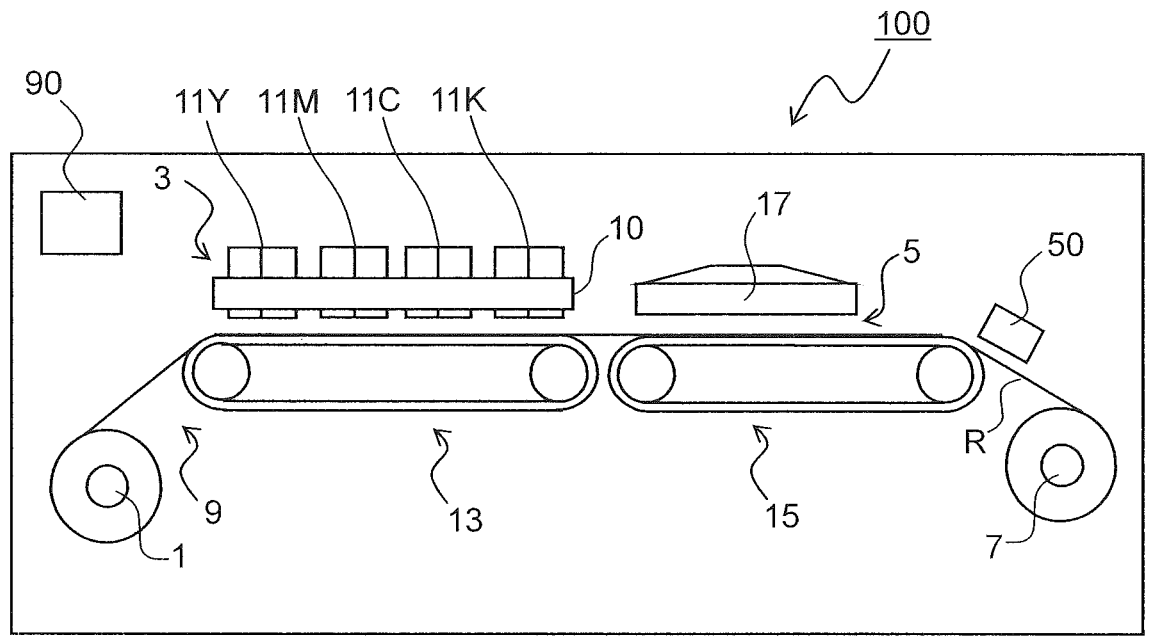
FIG. 1 is a schematic view showing an overall structure of an ink-jet printing device incorporating a fabric inspection device according to the present disclosure.

Hereinafter, with reference to the accompanying drawings, an embodiment of the present disclosure will be described. FIG. 1 is a schematic view showing an overall structure of an ink-jet printing device 100 incorporating a fabric inspection device 50 according to the present disclosure. The ink-jet printing device 100 is a device that prints on cloth R by a direct printing method, and includes, as shown in FIG. 1, a cloth feeding portion 1, an ink-jet recording portion 3, a drying portion 5, a cloth collecting portion 7, a fabric inspection device 50, and a control portion 90.

The cloth R in the form of continuous recording sheet is arranged in the cloth feeding portion 1 provided on the upstream side (in FIG. 1, the left side) of the ink-jet recording portion 3 in the conveying direction. The cloth feeding portion 1 includes a rotary shaft on which the cloth R in a roll is mounted and a motor which drives the rotary shaft to rotate in a predetermined rotation direction (neither is illustrated). As the motor is driven, the rotary shaft rotates, so that the cloth feeding portion 1 feeds out the cloth R to the downstream side in the conveying direction.

The ink-jet recording portion 3 includes line recording heads 11C, 11M, 11Y, and 11K held on a head housing 10. The recording heads 11C to 11K are supported at such a height as to form a predetermined gap (for example, 3 mm) from the conveying surface of a first belt conveying portion 13 arranged opposite the ink-jet recording portion 3.

According to a control signal from the control portion 90 (see FIG. 1), based on image data received from an external computer, the ink-jet recording portion 3 ejects ink from ink ejection nozzles of the recording heads 11C to 11K (unillustrated) toward the cloth R conveyed in a state held by suction on the conveying surface of the first belt conveying portion 13. Thus, on the cloth R, a color image is formed that has ink of four colors, namely cyan, magenta, yellow, and black, overlaid together.

The drying portion 5 includes a second belt conveying portion 15 arranged on the downstream side of the first belt conveying portion 13 in the conveying direction and a fan 17 arranged opposite the conveying surface of the second belt conveying portion 15. By blowing streams of air from the fan 17 toward the cloth R conveyed in a state held by suction on the conveying surface of the second belt conveying portion 15, the drying portion 5 dries the color image formed on the cloth R.

The cloth collecting portion 7 is arranged on the downstream side of the drying portion 5 in the conveying direction, and includes a rotary shaft and a motor (neither is illustrated) which drives the rotary shaft to rotate in a predetermined rotation direction. As the motor is driven, the rotary shaft rotates, so that the cloth collecting portion 7 collects, while winding up, the cloth R (printed article) having undergone a drying step in the drying portion 5.

Between the drying portion 5 and the cloth collecting portion 7, the fabric inspection device 50 that inspects the image formed on the cloth R is arranged. The structure of the fabric inspection device 50 will be described in detail later.

Figure 2:
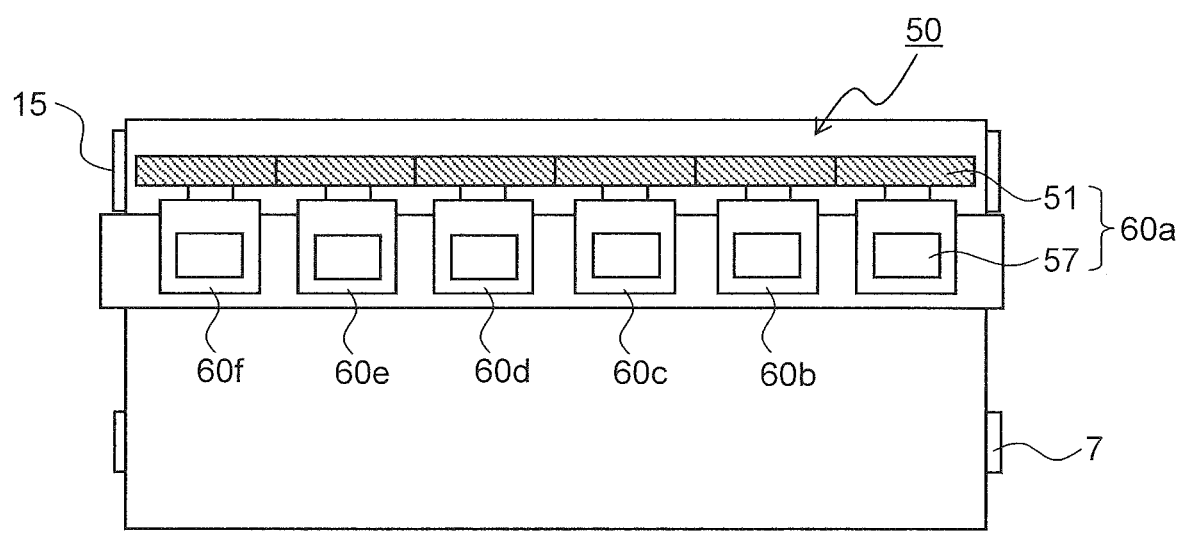
FIG. 2 is a plan view of the fabric inspection device according to one embodiment of the present disclosure as seen from the downstream side in the conveying direction.
Figure 3:
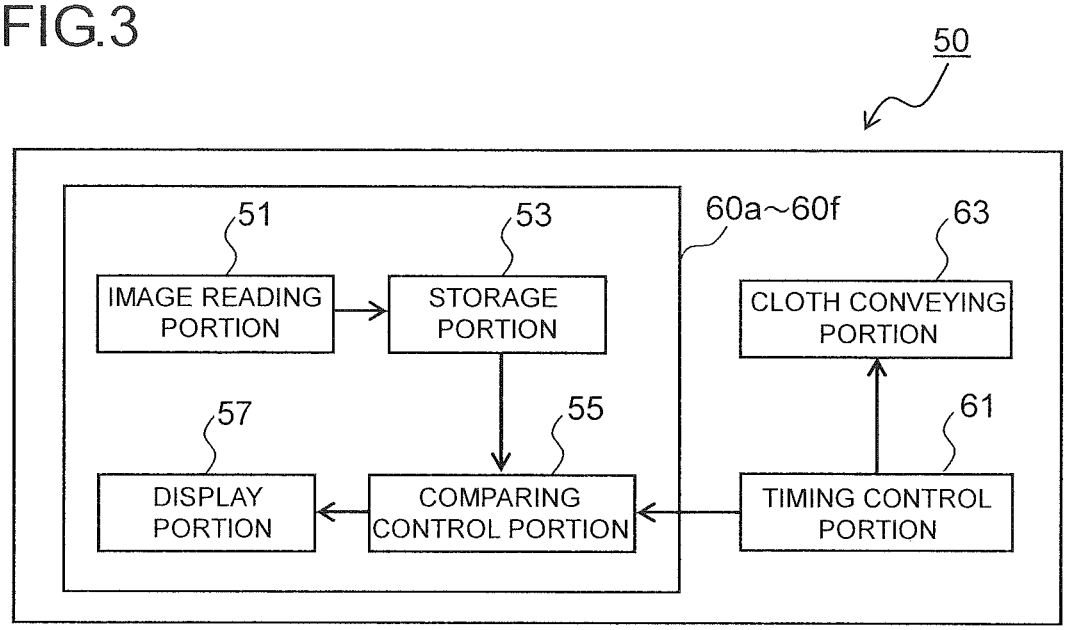
FIG. 3 is a block diagram showing one example of controlling channels in the fabric inspection device according to the embodiment.

FIG. 2 is a plan view of the fabric inspection device 50 according to one embodiment of the present disclosure as seen from the downstream side (in FIG. 1, the right side) in the conveying direction. FIG. 3 is a block diagram showing one example of controlling channels in the fabric inspection device 50 according to the embodiment. The fabric inspection device 50 includes an image reading portion 51, a storage portion 53, a comparing control portion 55, a display portion 57, a timing control portion 61, and a cloth conveying portion 63.

The image reading portion 51 reads an image formed on the cloth R by the ink-jet recording portion 3. The image reading portion 51 is a reading module of a CIS sensor (contact image sensor) type, and includes, inside it, a light source, a converging lens composed of a plurality of lenses, and a CMOS (complementary MOS) sensor as a reading means (none is illustrated). The light (image light) emitted from the light source and reflected from the cloth R (image face) is converged by the converging lens, and is then focused on the CMOS sensor. The focused image light is, in the CMOS sensor, divided into pixels to be converted into electrical signals commensurate with the densities at the respective pixels. In this way, image reading is achieved.

Although an example where a CMOS sensor is used as the image sensor in the image reading portion 51 has been discussed, instead, as the image sensor, a charge-coupled device, which is called a CCD, can be used. The image reading portion 51 includes two CIS sensors: one can read at a first resolution (for example, 600 dpi) equal to that of the image to be formed on the cloth R and the other can read at a second resolution (for example, 150 dpi) lower than the first resolution.

The storage portion 53 stores images read by the image reading portion 51 as image data. As the storage portion 53, for example, a RAM (random access memory) or a HDD (hard disk drive) is used.

The comparing control portion 55 takes the image data stored in the storage portion 53 as a reference image or as a comparison image (inspection image), and compares the image data of the comparison image with the image data of the reference image to check for image defects. The comparison method will be specifically described later.

The display portion 57 displays, based on the result of checking by the comparing control portion 55, whether or not there are image defects, where they are, how frequent they are, and the like. As the display portion 57, for example, a liquid crystal touch panel or the like is used.

In this embodiment, four modules comprising the image reading portion 51, the storage portion 53, the comparing control portion 55, and the display portion 57 are integrated into a unit as each of division comparing units 60a to 60f. As shown in FIG. 2, the division comparing units 60a to 60f are aligned in the width direction (the main scanning direction) of the cloth R.

With a structure as shown in FIG. 2, the first reading operation with respect to a reference image is similar in all of the division comparing units 60a to 60f. Thus, any one of the division comparing units 60a to 60f (for example, the division comparing unit 60a) may be taken as a main operation unit, and a link mode may be provided in which, as the division comparing unit 60a is operated, the other division comparing units 60b to 60f can be operated in the same manner simultaneously.

The timing control portion 61 regulates the timing with which the image reading portion 51 reads an image. Specifically, when the forefront pattern (or the forefront mark) of the image corresponding to one pitch is detected by the image reading portion 51 as will be described later, the timing control portion 61 generates a clock signal instructing the division comparing units 60a to 60f to start fabric inspection processing. Based on the clock signal from the timing control portion 61, the division comparing units 60a to 60f put into action image reading processing by the image reading portion 51 and storage processing to the storage portion 53 as well as comparison processing between the comparison image and the reference image by the comparing control portion 55.

The cloth conveying portion 63 conveys the cloth R having an image formed on it. In this embodiment, the cloth feeding portion 1, the first belt conveying portion 13, the second belt conveying portion 15, and the cloth collecting portion 7 in the ink-jet printing device 100 correspond to the cloth conveying portion 63. In a case of a fabric inspection device 50 that is used singly, that is, separately from the ink-jet printing device 100, a cloth feeding portion that feeds out the cloth R (printed article) to undergo fabric inspection and a cloth collecting portion that winds up the cloth R having undergone fabric inspection correspond to the cloth conveying portion 63.

The fabric inspection device 50 can be an optional device that is removable from the ink-jet printing device 100. In this way, one ink-jet printing device 100 can be used as a printer dedicated to printing on the cloth R and as a fabric inspection device.

Figure 4:
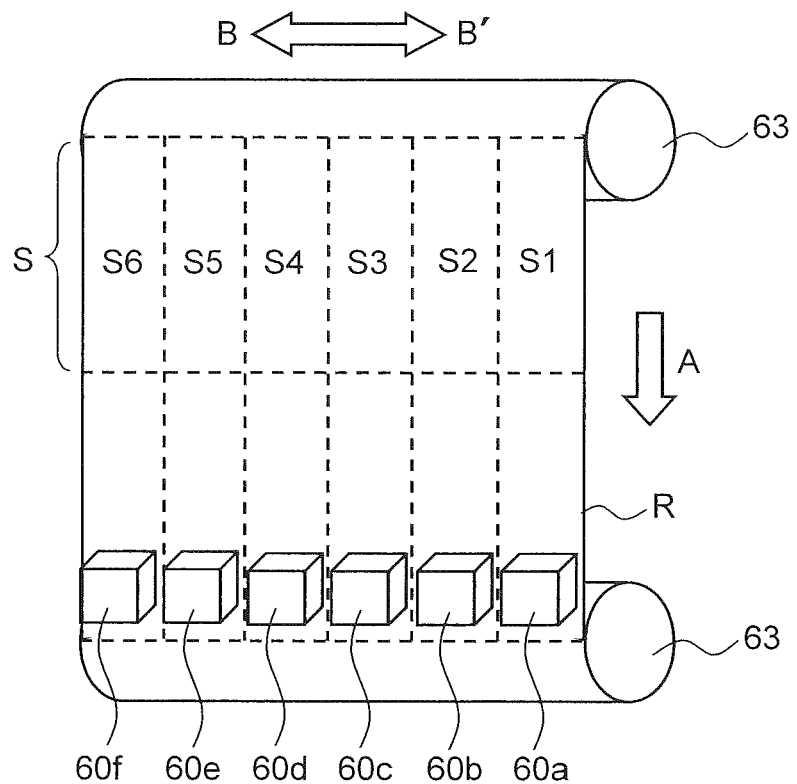
FIG. 4 is a schematic view showing a method of reading an image on cloth by use of the fabric inspection device according to the embodiment.

Next, a method of sensing image defects with the fabric inspection device 50 according to the embodiment will be described. FIG. 4 is a schematic view showing a method of reading an image on the cloth R by use of the fabric inspection device 50 according to the embodiment. Conventionally, in cloth printing, printing methods such as flat screen printing and rotary screen printing are used, and thus, in most cases, the same image (pattern) is recorded repeatedly with a predetermined pitch (within about 3 m) in the conveying direction (the direction indicated by arrow A) of the cloth R. Accordingly, in the fabric inspection device 50, the image reading portion 51 reads an image corresponding to one pitch as one unit S of inspection.

More specifically, one unit S of inspection is divided into six regions S1 to S6 in the width direction (the direction indicated by arrows B and B') perpendicular to the conveying direction of the cloth R, and the division comparing units 60a to 60f perform fabric inspection processing in each of the regions S1 to S6. When the maximum width of one unit S of inspection is 1.8 m, the width of each region S1 to S6 is 300 mm. When the cloth R with a width of 1.8 m is used, all the six division comparing units 60a to 60f are used. When the cloth R with a width of 1.2 m is used, any four of the division comparing units 60a to 60f (for example, the division comparing units 60b to 60e) can be used.

In this embodiment, out of a plurality of images continuously recorded on the cloth R, which is an actual printed article, an image corresponding to the forefront one pitch is taken as a reference image. This, compared with the conventional method relying on comparison with previously set reference data, makes it possible to prevent erroneous detection ascribable to variations in the properties of cloths R and to detect image defects with high accuracy.

Owing to the use of the six division comparing units 60a to 60f corresponding to the regions S1 to S6 of one unit S of inspection, the amounts of read data and comparison data in each of the division comparing units 60a to 60f are reduced (one-sixth of the total), resulting in an increased fabric inspection processing speed. As a result, it is possible to increase the conveying speed of the cloth R, and thereby to improve productivity of the ink-jet printing device 100. It is also possible to perform fabric inspection processing that suits cloths R with varying widths.

FIG. 5 is a schematic view showing a relationship between a reference image and a comparison image. With the timing of reading regulated by the timing control portion 61 (see FIG. 3), an image corresponding to the forefront unit S of inspection during continuous printing is read by the image reading portion 51. In the ink-jet printing device 100, various conditions are set as to the conveying speed of the cloth R and for ink color adjustment and after the conditions under which the best image is acquired are satisfied, continuous printing is started. Thus, the read image corresponding to the forefront unit S of inspection results in a high quality image with no image defects. Accordingly, the image corresponding to the forefront unit S of inspection is stored in the storage portion 53 as a reference image Ir.

Likewise, the images of units S of inspection corresponding to the second, third, fourth . . . patterns are read. The read images corresponding to the second and subsequent patterns are stored in the storage portion 53 as comparison images Ic1, Ic2, Ic3 . . . .

The comparison images Ic1, Ic2, Ic3 . . . are compared with the reference image Ir by the comparing control portion 55 to sense whether or not there are image defects. The comparison between the comparison images Id, Ic2, Ic3 . . . and the reference image Ir is achieved through comparison of color differences between the corresponding pixels.

Specifically, when at least one of the color differences of the three primary colors (RGB), that is red, green, and blue, between a given pixel (reference pixel) in the reference image Ir and a pixel at the same position (comparison pixel) in the comparison images Ic1, Ic2, Ic3 . . . is equal to or more than a predetermined value, it is determined that the reference pixel and the comparison pixel do not match. Each of RGB is represented in 8 bits and can represent 256 gradations. That is, the value of each of RGB can be 0 to 255.

Instead, it is possible to perform the comparison by use of the distance (color difference) ΔRGB between the reference pixel and the comparison pixels in an RGB color space. Specifically, when ΔRGB is equal to or more than a predetermined value, it is determined that the reference pixel and the comparison pixel do not match. Assume that the RGB values of the reference pixel are ($R_1$, $G_1$, $B_1$), and that the RGB values of the comparison pixels are ($R_2$, $G_2$, $B_2$); then, ΔRGB is calculated according to formula (1) below.

$$\Delta RGB = \sqrt{\{(R_2-R_1)^2+(G_2-G_1)^2+(B_2-B_1)^2\}} \tag{1}$$

With the checking method relying on comparison of individual color differences of RGB between the reference pixel and the comparison pixel, compared with the checking method relying on their comparison using ΔRGB, the sensitivity (comparison accuracy) to a specific hue of RGB is high, and thus it is possible to perform fabric inspection with high accuracy for the hue which, for example, a user considers important.

As described above, performing the comparison based on color differences of R, G, and B, compared with a visual inspection, makes it possible to perform an inspection with small variations, high accuracy, and high efficiency. Specifically, it is possible to sense with high accuracy such representative defects in cloth printing as an image with a missed dot and uneven density.

FIGS. 6A and 6B are conceptual diagrams showing images of different resolutions read in the image reading portion 51. FIG. 6A shows an image read at the first resolution (600 dpi, with a dot diameter of 40 μm). FIG. 6B shows an image read at the second resolution (150 dpi, with a dot diameter of 160 μm). In the image of 600 dpi shown in FIG. 6A, there are a plurality of pixels (here, six) in 4×4 dots. On the other hand, in the image of 150 dpi shown in FIG. 6B, there is a single pixel with a dot diameter of 160 μm.

To perform image inspection with high accuracy and to improve productivity, it is necessary to avoid erroneous detection ascribable to a displacement of the cloth R during conveying, uneven tension applied to the cloth R, and the like. Here, the fabric inspection device 50 according to the embodiment compares the color differences of RGB of each pixel by use of the reference image Ir and the comparison images Ic1, Ic2, Ic3 . . . read at the second resolution by the image reading portion 51. Table 1 shows one example of the comparison data.

TABLE 1

| Color | Reference Image | Comparison Image | Color Difference | Evaluation |
|---|---|---|---|---|
| R | 128 | 200 | 72 | Poor |
| G | 128 | 120 | 8 | Good |
| B | 128 | 119 | 9 | Good |

In the example shown in Table 1, it was assumed that the permissible value of color differences was 10. Although the color differences of green (G) and blue (B) were 8 and 9 so that these were within the permissible range, the color difference of red (R) was 72. Thus, the data in Table 1 leads to a judgement that the pixels of the reference image Ir and the comparison image Ic1 (Ic2, Ic3 . . . ) do not match.

Reading at a resolution (second resolution) lower than the resolution (first resolution) of the formed image makes it possible to avoid erroneous detection ascribable to a displacement of the cloth R during conveying, uneven tension applied to the cloth R, and the like. Moreover, the image reading speed in the image reading portion 51 increases and the processing speed of comparison of color differences by the comparing control portion 55 increases, resulting in improved efficiency of fabric inspection and improved productivity of printed articles.

The image reading portion 51 can previously read an image at both the first resolution (600 dpi) and the second resolution (150 dpi) and the storage portion 53 can store both the image read at the first resolution and the image read at the second resolution. Then, the pixel data of the reference image and that of the comparison image read at the second resolution are compared, and if at least one of the color differences of RGB is equal to or more than the permissible value (10), the pixel data of the reference image and that of the comparison image acquired by reading at the first resolution are compared again. In this way, by comparing the pixel data of the reference image and that of the comparison image read at the first resolution, it is possible to specify the position of a defective pixel more accurately.

Although, in this embodiment, the image reading portion 51 is used which includes two CIS sensors that can read at the first resolution (600 dpi) and at the second resolution (150 dpi) lower than the first resolution, an image reading portion 51 can be used which includes only a CIS sensor that can read at the first resolution (600 dpi). Specifically, the image read at the first resolution is, as it is, stored in the storage portion 53, and after performing compression processing (processing to reduce to 25%) from the first resolution to the second resolution (150 dpi) in the comparing control portion 55, the pixel data of the reference image and that of the comparison image are compared. If at least one of the color differences of RGB is equal to or more than the permissible value (10), the reference image and the comparison image read at the first resolution are retrieved from the storage portion 53 to compare their pixel data again.

Also with this configuration, comparison processing is performed at the second resolution, and it is thus possible to avoid erroneous detection ascribable to a displacement of the cloth R during conveying, uneven tension applied to the cloth R, and the like. With only one CIS sensor included, it is possible to reduce cost. The image reading speed in the image reading portion 51 does not increase but the processing speed of comparison of color differences by the comparing control portion 55 increases. This improves efficiency of fabric inspection and also improves productivity of printed articles.

If the comparison at the first resolution (600 dpi) is not performed again, an image reading portion 51 can be used which includes only a CIS sensor that can read at the second resolution (150 dpi).

Next, edge processing in the fabric inspection device 50 according to the embodiment will be described. When the pixels to be compared include an edge part (border) of the image, it is difficult to compare color differences with high accuracy. Specifically, when the edge position of the image is deviated ascribable to a displacement of the cloth R during conveying, uneven tension applied to the cloth R, and the like, this leads to erroneous detection such as recognizing image defects where there are actually none or recognizing no image defects where there actually are.

Figure 7:
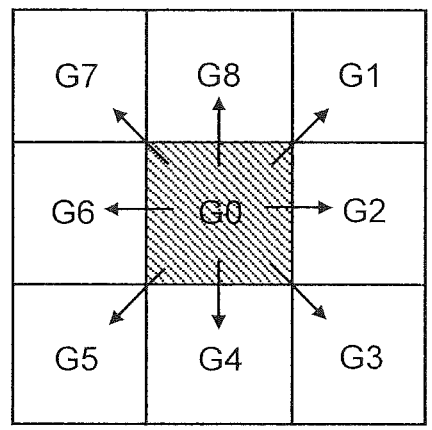
FIG. 7 is a diagram showing a reference pixel and peripheral pixels in the reference image.

To avoid that, in this embodiment, as shown in FIG. 7, color differences of RGB between a reference pixel G0 and peripheral pixels G1 to G8 in the reference image Ir are compared, and if at least one of color differences is equal to or more than a predetermined value at least at one of the peripheral pixels G1 to G8, no comparison is performed for the reference pixel G0 between the reference image Ir and the comparison images Ic1, Ic2, Ic3 . . . . In other words, only if color differences between the reference pixel G0 and the peripheral pixels G1 to G8 are less than the predetermined value, comparison is performed for the reference pixel G0 between the reference image Ir and the comparison images Ic1, Ic2, Ic3 . . . .

Figure 8:
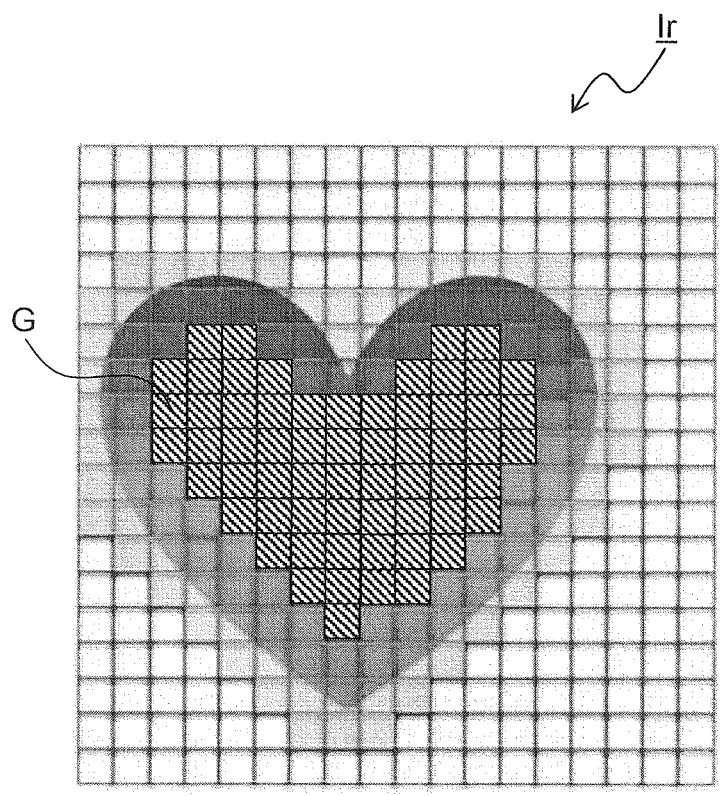
FIG. 8 is a diagram showing a group of pixels in the reference image that are subjected to comparison of color differences with the corresponding pixels in a comparison image.

For example, in the reference image Ir shown in FIG. 8, only a group of pixels G indicated by hatching are subjected to comparison of color differences with the corresponding pixels of the comparison images Ic1, Ic2, Ic3 . . . . This makes it possible to exclude pixels in the edge part which pose difficult in comparison of color differences and to improve detection accuracy of image defects.

It is preferable that the permissible value of color differences between the reference pixel G0 and the peripheral pixels G1 to G8 when edge processing is performed be set separately from the permissible value of color differences of pixels between the reference image Ir and the comparison images Id, Ic2, Ic3 . . . . Generally, the higher the permissible value of color differences in comparison with the peripheral pixels G1 to G8, the lower the number of pixels removed by edge processing, permitting comparison of images with high accuracy. For example, in a case where the permissible value of color differences is 10 in the check of whether or not pixels match between the reference image Ir and the comparison images Ic1, Ic2, Ic3 . . . , the permissible value of color differences in comparison between the reference pixel G0 and the peripheral pixels G1 to G8 can be set at 50.

Although, here, color differences of RGB are individually compared when the reference pixel G0 and the peripheral pixels G1 to G8 are compared, it is instead possible to compare them by use of ΔRGB.

Figure 9:
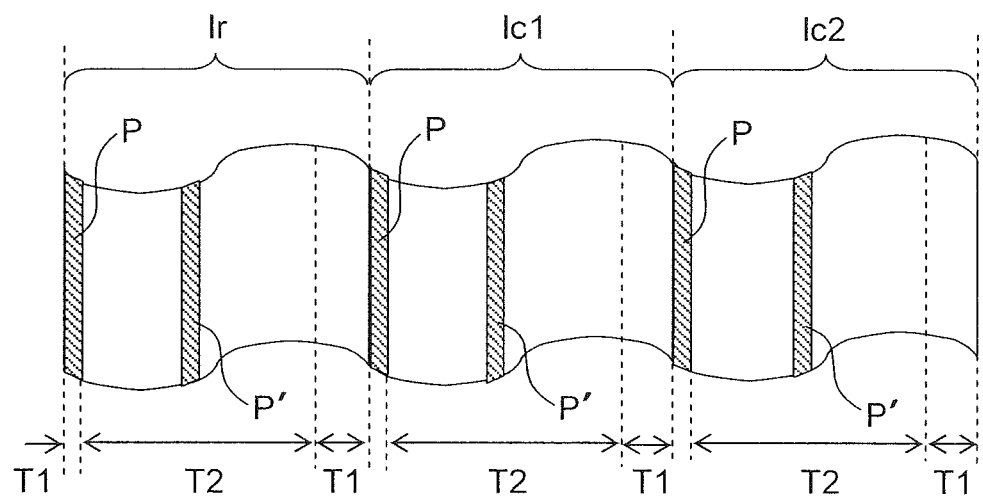
FIG. 9 is a schematic diagram illustrating a forefront pattern search mode in which the fabric inspection device according to the embodiment can operate.

Next, control for detection of the forefront pattern when the image reading portion 51 reads an image of one unit S of inspection will be described. FIG. 9 is a schematic diagram illustrating a forefront pattern search mode in which the fabric inspection device 50 according to the embodiment can operate. When continuous printing is started and the cloth R on which the image has been recorded in the ink-jet recording portion 3 is conveyed, first, the forefront pattern P starts to be searched for by the image reading portion 51. In FIG. 9, T1 indicates a search range where the forefront pattern P is searched for.

When the forefront pattern P is detected, the timing control portion 61 generates a clock signal instructing the division comparing units 60a to 60f (see FIG. 2) to start fabric inspection processing. Based on the clock signal, the division comparing units 60a to 60f start image reading processing. The image corresponding to the forefront one pitch is stored as a reference image Ir in the storage portion 53.

When the forefront pattern P is detected by the image reading portion 51, over a predetermined range after that, the timing control portion 61 prohibits the image reading portion 51 from searching for the forefront pattern P. In FIG. 9, T2 indicates a search prohibited range where the search for the forefront pattern P is prohibited. Then, before the forefront pattern P of the image (comparison image Ic1) corresponding to a second pitch reaches the image reading portion 51, the search for the forefront pattern P is restarted. Reading processing for the comparison images Ic2 and Ic3 is performed similarly.

Providing the search prohibited range T2 as described above eliminates the possibility of, when there is a pattern P' similar to the forefront pattern P in an image corresponding to one pitch, it being erroneously detected as the forefront pattern P. As compared with a case where the search for the forefront pattern P continues to be performed, it is possible to reduce the amount of data processed by the timing control portion 61 and to increase the processing speed. As a result, it is possible to increase the conveying speed of the cloth R, and thereby to improve productivity of printed articles on the ink-jet printing device 100.

Figure 10:
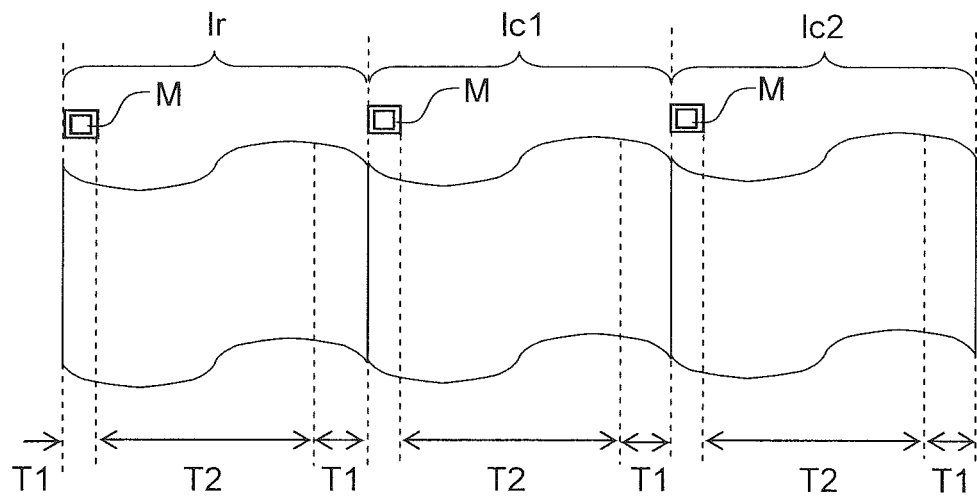
FIG. 10 is a schematic diagram illustrating a forefront mark recognition mode in which the fabric inspection device according to the embodiment can operate.

FIG. 10 is a schematic diagram illustrating a forefront mark recognition mode in which the fabric inspection device 50 according to the embodiment can operate. In FIG. 10, a forefront mark M is recorded outside the image (at a position next to the forefront part of image in the width direction) in the ink-jet recording portion 3, and when the forefront mark M is detected by the image reading portion 51, the timing control portion 61 generates a clock signal instructing the division comparing units 60a to 60f to start fabric inspection processing. That is, except that the image reading portion 51 searches for the forefront mark M instead of the forefront pattern P, this mode is similar to the forefront pattern search mode shown in FIG. 9.

Also in the forefront mark recognition mode illustrated in FIG. 10, when the forefront mark M is detected by the image reading portion 51, over a predetermined range after that, the search for the forefront mark M by the image reading portion 51 is prohibited; that is, a search prohibited range T2 is provided. Since the forefront mark M is recorded separately from the reference image Ir (and the comparison images Ic1, Ic2 . . . ), there is no possibility of a similar pattern in the image being erroneously detected; even then, by providing the search prohibited range T2, it is possible to reduce the amount of data processed by the timing control portion 61.

The present disclosure may be implemented in any other manner than in the embodiments described above, and allows for many modification without departure from the spirit of the present disclosure. Although, for example, in this embodiment, six division comparing units 60a to 60f are used which each have four modules comprising the image reading portion 51, the storage portion 53, the comparing control portion 55, and the display portion 57 integrated into a unit, it is possible to set the number of division comparing units as necessary.

The present disclosure is applicable to a fabric inspection device that detects defects in images of the same pattern recorded repeatedly with a predetermined pitch on a continuous recording sheet. According to the present disclosure, it is possible to provide a fabric inspection device that can detect image defects with high accuracy, and to provide an ink-jet printing device incorporating such a fabric inspection device.

What is claimed is:

1. A fabric inspection device comprising:
a sheet conveying portion that conveys a continuous recording sheet on which a plurality of images of a same pattern are formed repeatedly with a predetermined pitch;
an image reading portion that shines light to the images recorded on the recording sheet conveyed by the sheet conveying portion, the image reading portion dividing reflected light, which is image light, into pixels and converting the image light into an electrical signal, the image reading portion thereby reading the images;
a timing control portion that generates a clock signal instructing to start fabric inspection processing when the image reading portion detects a forefront pattern of the images corresponding to one pitch;
a storage portion that stores the plurality of images of the same pattern read by the image reading portion as image data;
a comparing control portion that takes, out of the plurality of images stored in the storage portion, part of the images recorded on the recording sheet corresponding to a forefront one pattern as a reference image, the comparing control portion comparing color differences in mutually corresponding pixels between the image data of the reference image and the image data of a comparison image having the same pattern as the reference image and recorded on the recoding sheet later than the reference image, the comparing control portion thereby performing, based on the clock signal transmitted from the timing control portion, the fabric inspection processing to check for image defects in the comparison image; and
a display portion that displays at least one of whether or not there are image defects,
where image defects are, and how frequent image defects are in the comparison image based on a result of checking by the comparing control portion.

2. The fabric inspection device according to claim 1, wherein
the comparing control portion compares the image data of the reference image and the image data of the comparison image at a second resolution lower than a first resolution that is a resolution of the images recorded on the recording sheet.

3. The fabric inspection device according to claim 2, wherein
the image reading portion is capable of reading images recorded on the recording sheet at the first resolution, and
the comparing control portion performs compression processing to reduce a resolution of the plurality of images stored in the storage portion from the first resolution to the second resolution.

4. The fabric inspection device according to claim 2, wherein
the image reading portion is capable of reading the images recorded on the recording sheet at both the first and second resolutions, and
the comparing control portion compares the image data of the comparison image of the second resolution stored in the storage portion with the image data of the reference image of the second resolution.

5. The fabric inspection device according to claim 1, wherein
the comparing control portion
compares color differences between a reference pixel in the reference image and peripheral pixels around the reference pixel,
compares, when the color differences between the reference pixel and the peripheral pixels are less than a first permissible value V1, the color differences between the reference pixel and a comparison pixel at a same position as the reference pixel in the comparison image, and
determines, when the color differences between the reference pixel and the comparison pixel is equal to or more than a second permissible value V2, that the reference pixel and the comparison pixel do not match.

6. The fabric inspection device according to claim 5, wherein
the first permissible value V1 is higher than the second permissible value V2.

7. The fabric inspection device according to claim 5, wherein
the comparing control portion
compares, when at least one of color differences of RGB between the reference pixel and the peripheral pixels is less than the first permissible value V1, color differences of RGB between the reference pixel and the comparison pixel, and
determines, when at least one of the color differences of RGB between the reference pixel and the comparison pixel is more than the second permissible value V2, that the reference pixel and the comparison pixel do not match.

8. The fabric inspection device according to claim 5, wherein
the comparing control portion
compares, when a color difference RGB between the reference pixel and the peripheral pixels in an RGB color space is less than the first permissible value V1, a ΔRGB between the reference pixels and the comparison pixel, and
determines, when the ΔRGB between the reference pixel and the comparison pixel is equal to or more than the second permissible value V2, that the reference pixel and the comparison pixel do not match.

9. The fabric inspection device according to claim 5, wherein
the comparing control portion
compares the color differences between the reference image and the comparison image at a second resolution lower than a first resolution that is a resolution of the images recorded on the recording sheet, and
compares again, when the color differences between the reference pixel and the comparison pixel compared at the second resolution is equal to or more than a predetermined value, the color deference between the reference pixel in the reference image read at the first resolution and the comparison pixel in the comparison image read at the first resolution.

10. The fabric inspection device according to claim 1, wherein
the comparing control portion
compares color differences of RGB between a reference pixel in the reference image and a comparison pixel at a same position as the reference pixel in the comparison image, and
determines, when at least one of the color differences of RGB is equal to or more than a predetermined value, that the reference pixel and the comparison pixel do not match.

11. The fabric inspection device according to claim 1, wherein
when the image reading portion detects a forefront suggesting indication that suggests a forefront part of an nth image (n is a natural number) among the images, the timing control portion provides, over a predetermined range from the forefront suggesting indication to the forefront suggesting indication of an (n+1)th image, a search prohibited range for which a search for the forefront suggesting indication by the image reading portion is prohibited.

12. The fabric inspection device according to claim 11, wherein
the forefront suggesting indication is a forefront pattern in a forefront part of the image corresponding to one pitch.

13. The fabric inspection device according to claim 11, wherein
the forefront suggesting indication is a forefront mark that is formed next to the forefront part of the image corresponding to one pitch in a width direction of the recording sheet.

14. The fabric inspection device according, to claim 1, comprising:
a division comparing unit that has the image reading portion, the storage portion, the comparing control portion, and the display portion integrated into a unit, wherein
a plurality of the division comparing units are aligned in a width direction perpendicular to a conveying direction of the recording sheet.

15. An ink-jet printing device comprising:
an ink-jet recording portion that records an image by ejecting ink on the recording sheet; and
a fabric inspection device according to claim 1 arranged on a downstream side of the ink-jet recording portion in the conveying direction of the recording sheet.

* * * * *